(12) United States Patent
Nakamura

(10) Patent No.: US 7,225,224 B2
(45) Date of Patent: May 29, 2007

(54) TELECONFERENCING SERVER AND TELECONFERENCING SYSTEM

(75) Inventor: Hiroaki Nakamura, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 681 days.

(21) Appl. No.: 10/394,582

(22) Filed: Mar. 24, 2003

(65) Prior Publication Data

US 2004/0015550 A1    Jan. 22, 2004

(30) Foreign Application Priority Data

Mar. 26, 2002    (JP) .............................. 2002-085072

(51) Int. Cl.
*G06F 15/16* (2006.01)

(52) U.S. Cl. ............... 709/204; 379/202.01; 379/88.14

(58) Field of Classification Search ............... 709/204, 709/205, 218, 238, 246; 379/202.01, 201.01, 379/205.01, 88.14
See application file for complete search history.

(56) References Cited

U.S. PATENT DOCUMENTS

| | | | |
|---|---|---|---|
| 6,453,336 B1 * | 9/2002 | Beyda et al. ............... 709/204 |
| 6,760,749 B1 * | 7/2004 | Dunlap et al. ............... 709/204 |
| 6,801,663 B2 * | 10/2004 | Matsushita et al. ......... 382/236 |
| 6,816,468 B1 * | 11/2004 | Cruickshank ............... 370/260 |
| 7,007,235 B1 * | 2/2006 | Hussein et al. ............. 715/751 |
| 7,039,675 B1 * | 5/2006 | Kato .......................... 709/204 |
| 2005/0114520 A1 * | 5/2005 | White et al. ................. 709/228 |

* cited by examiner

*Primary Examiner*—Creighton Smith
(74) *Attorney, Agent, or Firm*—Sughrue Mion, PLLC

(57) ABSTRACT

Disclosed herein is a teleconferencing system that enables disabled persons to conveniently participate in teleconferences. The format converting means of the server converts text or voice data inputted from a transmitting party to the receiving method corresponding to the telephone terminal of each destination terminal registered in the registration portion to obtain transmission data matched to the receiving method of each of the telephone terminals. A transmitting portion sends the transmission data to the respective telephone terminals.

23 Claims, 6 Drawing Sheets

| PARTICIPANT | USER 1 | USER 2 | USER 3 | USER 4 |
|---|---|---|---|---|
| TERMINAL TYPE | PERSONAL COMPUTER | CELLULAR PHONE | STATIONARY PHONE | TELEVISUAL TELECONFERENCING APPARATUS |
| INPUT FORMAT | TEXT | VOICE | VOICE | VOICE |
| RECEPTION FORMAT | TEXT | VOICE | VOICE | VOICE |
| LANGUAGE TYPE | La | Lb | La | La |

FIG.3

TELECONFERENCING SERVER AND TELECONFERENCING SYSTEM

BACKGROUND OF THE INVENTION

1. Field of the Invention

The present invention relates to a teleconferencing server and a teleconferencing system that utilizes a plurality of telephone terminals to realize teleconferencing.

2. Description of the Related Art

There are in use today systems that enable users at respectively remote locations to hold a teleconference. In recent years, accompanying the reduction in the price of televisual phones, the spread of personal computers and the internet, and the expansion of the functionality of stationary telephones and mobile telephones, including cellular phones (hereinafter collectively referred to as telephone terminals), teleconferencing systems using a variety of types of telephone terminals have been proposed. According to these teleconferencing systems, the voice data from the telephone terminal of a teleconference participant that makes a transmission is subjected to a multiplexing process and transmitted to the telephone terminal of each participant to realize the teleconference. Among the proposed systems are systems in which an image data representing an image of the face of the transmitting party (the conference participant transmitting voice data) or an image data obtained by synthesizing an image of a virtual conference room in which an image of the face of each conference participant appears, is transmitted along with the voice data to impart a feeling close to that as if all the participants of the conference were present in the same conference room, and which record the contents of the conference and automate processes such as participant registration, billing, and the like with the aim of helping smooth the progress of the teleconference.

As the number of disabled persons hired by companies has increased in recent years, disabled and non-disabled persons are participating in the same conferences, even in international conferences. It goes without saying that under these conditions communication must be facilitated, for which it is necessary that the speech of non-disabled persons be translated into sign language or readable text for those with hearing or sight disabilities, and that sign language or written text be translated into speech so that all participants can communicate. However, such a system has not yet been realized.

SUMMARY OF THE INVENTION

The present invention has been developed in consideration of the forgoing circumstances, and it is an object of the present invention to provide a teleconferencing server and teleconferencing system that enables people with disabilities such as impaired hearing and the like to participate in teleconferences in a convenient manner.

The teleconferencing server according to the present invention is a teleconferencing server which realizes teleconferencing utilizing a plurality of telephone terminals, comprising:

an input format and reception format registration means for registering the input format and the reception format of each of the telephone terminals, a receiving means for receiving the input data inputted from the telephone terminals by the input format of the respective telephone terminal, a conversion means for converting the received input data to data conforming to the appropriate reception format of each of the plurality of telephone terminals, and a transmitting means for transmitting the converted input data converted by the conversion means to the telephone terminal having the target reception format.

Here, it is preferable that the "input format" and "reception format" include at least three of voice, text, image, and Braille. Here, "image format" refers to a transmitting and receiving format for transmitting and receiving an image of the face of a conference participant or an image conveying what the transmitting party's hands are doing so as to enable conference participation by use of lip reading or sign language.

It is preferable that the teleconferencing server according to the present invention comprise a language type recording means for recording the language utilized by the user of each of the telephone terminals, and a language type conversion means for converting the input data to the language type utilized by each user, wherein the transmitting means is a means for transmitting the converted input data converted by the language type conversion means to the target telephone terminal.

The teleconferencing system according to the present invention is a teleconferencing system comprising a plurality of telephone terminals and a teleconferencing server, wherein the telephone terminals transmit as distribution data the input data that is transmitted from each telephone terminal to the telephone terminals other than the telephone terminal that has transmitted said input data, further comprising a communication means for performing the transmission of the input data from the telephone terminals to the teleconferencing server, and the reception of the distribution data from the teleconferencing server, an input means for inputting the input data transmitted from the communication means to the teleconferencing server, a reproduction format setting means for setting the reproduction format of the distribution data from the teleconferencing server which has been received by way of the communication portion, a distribution data format converting means for converting the reproduction format of said distribution data to the format appropriate to that set by the reproduction format setting means, and a reproduction means for reproducing the distribution data converted by the distribution data format converting means in the reproduction format set by the reproduction format setting means.

Therefore, according to the teleconferencing system of the present invention, the telephone terminals utilized thereby differ from conventional telephone terminals, which receive and reproduce data in the same format, e.g., a voice terminal receives voice data and reproduces voice and an image terminal receives image data and reproduces images. The teleconferencing system of the present invention receives data (here, distribution data) that is then converted to data conforming to a reproduction format set at the reproduction format setting means. The converted data is then reproduced in the reproduction format by the reproducing means.

According to the teleconferencing system of the present invention, it is preferable that the reproduction format setting means of the telephone terminal is a means capable of setting a plurality of reproduction formats, the distribution data format converting means is a means for converting each distribution data to the respective the reproduction format set by the reproduction format setting means, and the reproduction means is a means capable of reproducing, in the respective format, the distribution data converted by the reproduction format converting means.

Here, when the distribution data of a plurality of formats is reproduced by the reproduction means, the various reproduction formats can be reproduced simultaneously, or each in a time division manner for each reproduction format.

Further, for cases in which the distribution data that has been transmitted from the teleconferencing server is in the reproduction format conforming to the reproduction format that has been set at the reproduction format setting means, e.g., the distribution data is voice data and the reproduction format of the telephone terminal has been set to the voice format, it is preferable that the reproduction format converting means does not subject the distribution data to a conversion process. In this case "No conversion" can also be specified as a conversion option.

According to the teleconferencing server of the present invention, by use of a converting means it becomes possible to convert input data inputted from telephone terminal apparatuses having different input formats and receiving methods such as text format, voice format, image format and the like, to the receiving format of the receiving telephone terminal apparatus so that, for example, a voice format transmission can be converted to text for conference participants having a hearing or speech disability. Therefore, it becomes possible for persons with such disabilities to conveniently participate in teleconferences, which are for the most part generally conducted such that communication is mainly performed by voice transmission.

In the case that the teleconferencing server according to the present invention comprises a language type converting means for converting the input data to the desired language type of the user of a telephone terminal, the input data can be converted to the language type of the receiving terminal and transmitted, enabling teleconferencing by participants who speak different languages.

According to the teleconferencing system of the present invention, the distribution data format converting means converts the distribution data sent from the server, i.e., the input data from another telephone terminal, to data conforming to the reproduction format set by the reproduction format setting means, and the reproduction means reproduces the converted reproduction data in the corresponding reproduction format. Therefore, a disabled person having, for example, a hearing impairment can have distribution data that is voice data converted to text data if the reproduction format of the terminal of the hearing disabled person is set to text format, whereby it becomes possible to participate in a teleconference, even in a case that the teleconference is conducted by means of a teleconferencing server not provided with a function for converting the format of the distribution data.

Further, according to the teleconferencing system of the present invention, if the reproduction format setting means, the distribution data format converting means and the reproduction means of the telephone terminal are capable of supporting a plurality of reproduction formats, a plurality of persons wishing to use different reproduction formats can participate in a teleconference using the same telephone terminal.

BRIEF DESCRIPTION OF THE DRAWINGS

FIG. 3 is a table illustrating an example of the content of the memory portion 25 of the server 10 shown in FIG. 2.

DESCRIPTION OF THE PREFERRED EMBODIMENTS

Hereinafter the preferred embodiments of the present invention will be explained with reference to the attached drawings.

Figure 1:
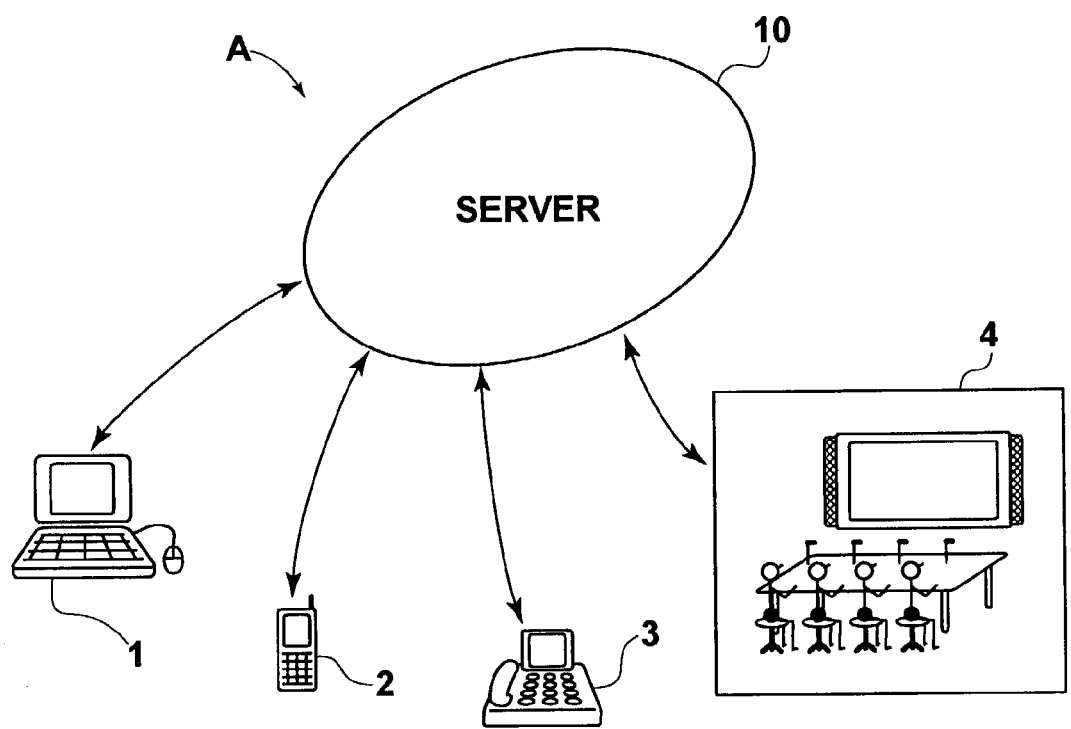
FIG. 1 is a schematic drawing of a teleconferencing system according to an embodiment of the teleconferencing server of the present invention.

FIG. 1 is a block diagram of the configuration of a teleconferencing system A according to an embodiment of the teleconferencing server of the present invention. As shown in FIG. 1, the teleconferencing system A according to the present embodiment comprises: telephone terminals such as a personal computer 1 utilizing an internet phone, a cellular phone 2, a stationary telephone 3 equipped with a liquid crystal display, a televisual teleconferencing apparatus 4, and the like; and a server 10 that realizes a teleconference utilizing the aforementioned telephone terminals. The server 10 and each of the telephone terminals are connected by a public communications network such as a telephone network, the internet or the like.

Figure 2:
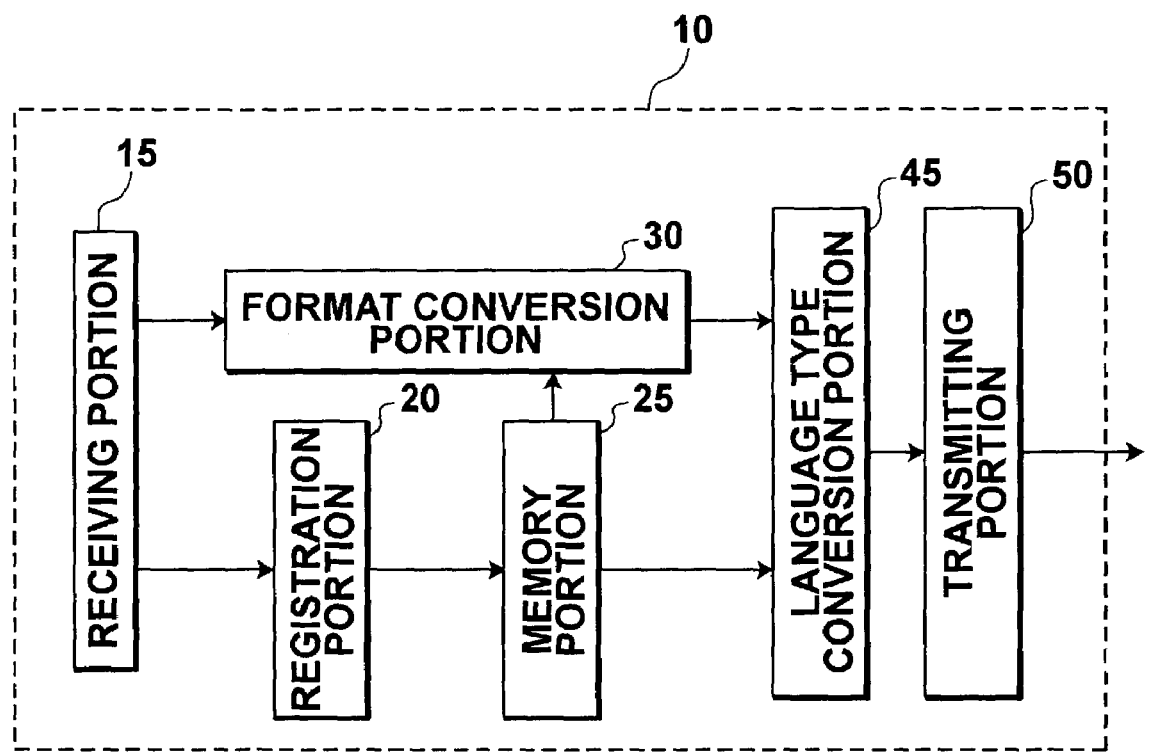
FIG. 2 is a schematic drawing of the server 10 with which the teleconferencing system of FIG. 1 is provided.

FIG. 2 is a block drawing of the server 10 of the teleconferencing system A shown in FIG. 1. As shown in FIG. 2, the server 10 comprises: an input receiving portion 15 for receiving input from each of the telephone terminals; a registration portion 20 for prompting, via the telephone terminal of each conference participant, each user to register their name, terminal type, input format (text or voice), reception format (text or voice), and type of language L used; a memory portion 25 for storing the registration data for each participant registered by the registration means 20; a format conversion portion 30 for converting the format of input data that has been inputted, via the receiving means 15, from a transmitting party (a participant using a text input format is also referred to as a transmitting party) after the conference has begun to the reception format of each destination telephone terminal; a language type conversion portion 45 for converting, to the registered language type of the user of the respective destination telephone terminal, the input data converted by the format converting means 30; and a transmitting portion 50 for transmitting the output data obtained for each respective telephone terminal by the conversion processing performed by language type converting means 45 to each target telephone terminal.

FIG. 3 is a table illustrating one example of the memory content, which consists of the content registered by the registration portion 20 before the conference begins, of the memory portion 25. As shown in FIG. 3, the memory portion 25 records the terminal type utilized by the participating user, said user's name, said user's transmission inputting format, said user's reception format for receiving transmissions from other participants, and said user's language type L, for each user (User 1, User 2, etc.). In this fashion, the when the registration process has been completed by the registration portion 20, the preparations for opening the conference are complete.

Next, using the example shown in FIG. 3, the operation of the server 10 of the teleconferencing system A of the current embodiment after a teleconference has begun will be explained in more detail.

Figure 4:
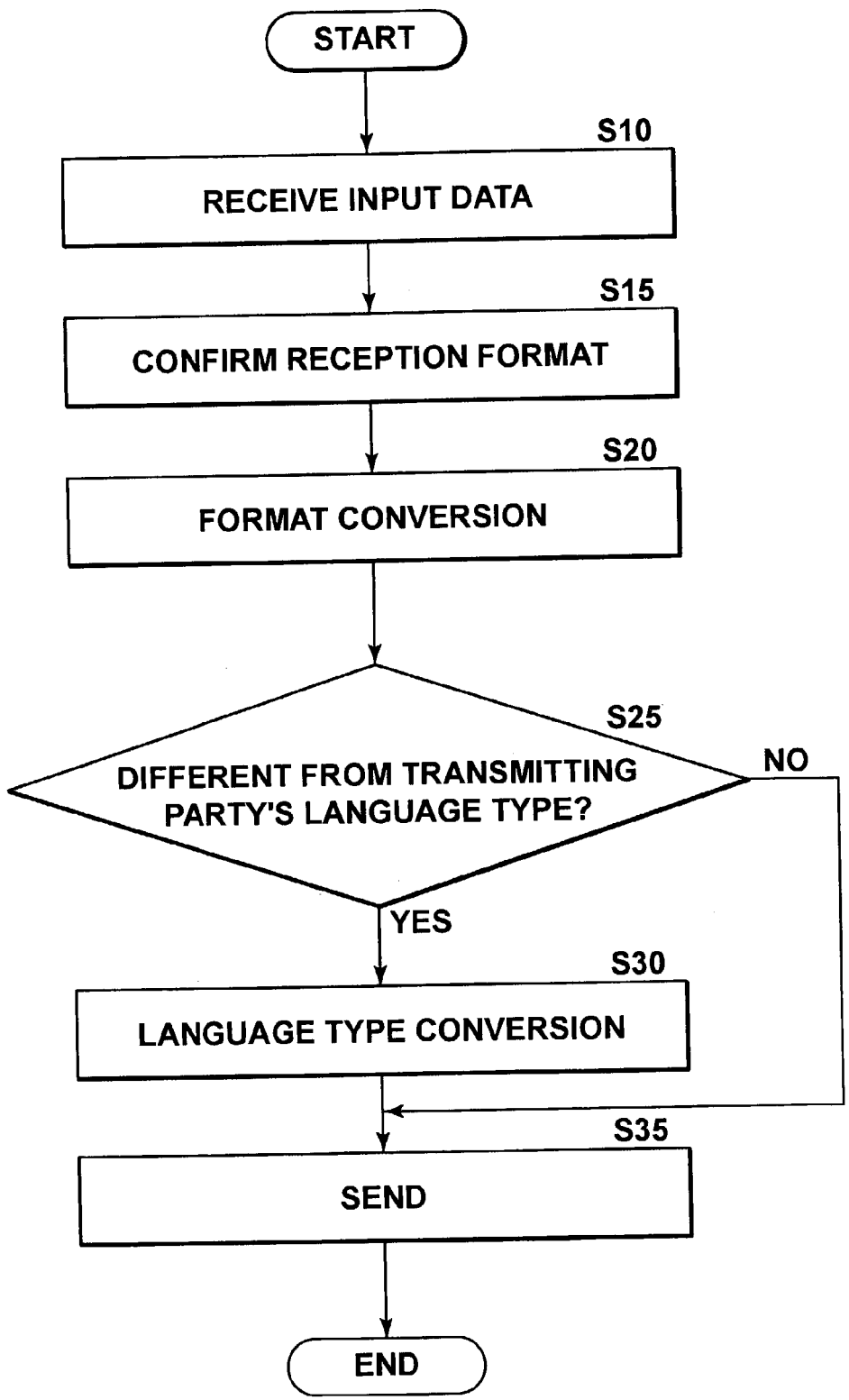
FIG. 4 is a flowchart of the operation of the server 10 shown in FIG. 2.

FIG. 4 is a flowchart of the operation of the server 10 after a teleconference has begun. As shown in FIG. 4, when a teleconference is started, the receiving portion 15 of the server 10 receives input data in the form of text or voice data from any of the telephone terminals (step S10), whereupon the format conversion portion 30 refers to the memory content of the memory portion 25 to confirm the reception format of each of the telephone terminals (step S15), and converts said input data to the reception format of each destination telephone terminal (step S20). In a case, for example, in which the transmitting party is user 2, because the input data is voice data, the format conversion portion converts the voice data from user 2 to the text format matching the reception format of user 1; however, because the reception format of user 3 is the same as that of user 2, that is, voice format, the transmission data to be sent to the stationary telephone apparatus of user 3 is the voice data, in unconverted form. Upon reception of the transmission data outputted from the format conversion portion 30, the language type conversion portion 45 first refers to the memory content of the memory portion 25 to compare the language type L used by the transmitting party to the language type utilized by each destination user (step S25). If the language type of the transmitting party and the receiving party is the same (step S25: No; e.g., when the transmitting party is user 1, and the destination user is user 3), the language type conversion portion 45 outputs the transmission data from the format conversion portion 30 as is, that is, in the format matching the reception format of the receiving party, to the transmitting portion 50; however, if the language type of the transmitting party and the receiving party is the different (step S25: Yes; e.g., when the transmitting party is user 1, and the destination user is user 2), the language type conversion portion 45 converts the transmission data from the format conversion portion 30 to the language type L used by the destination user and outputs the data obtained thereby to the transmitting portion 50 (step S30).

The format conversion portion 30 and the language type conversion portion 45 perform the processes of steps S15 through S30 for each destination telephone terminal (or user) to obtain the transmission data to be sent to each respective destination telephone terminal (or user).

The transmitting portion 50 sends the transmission data obtained by the format conversion portion 30 and the language type conversion portion 45 for each destination telephone terminal to each respective destination telephone terminal.

In this fashion, according to the teleconferencing system A of the current embodiment, by converting the format of the input data from the receiving party to the format matching the reception format of the receiving party, disabled persons having a hearing or speech disability are enabled to conveniently participate in teleconferences.

Further, according to the teleconferencing system A shown in FIG. 1, by converting the language type of the transmission data to that matching the language type utilized by the destination user, teleconferencing can be realized between participants who speak different languages.

Still further, according to the teleconferencing system A shown in FIG. 1, though only voice and text formats are used as reception and transmission formats, the present invention is not limited thereto; a system configuration enabling communication by sign language and lip reading, or a configuration for sending and converting Braille format can also be employed.

Figure 5:
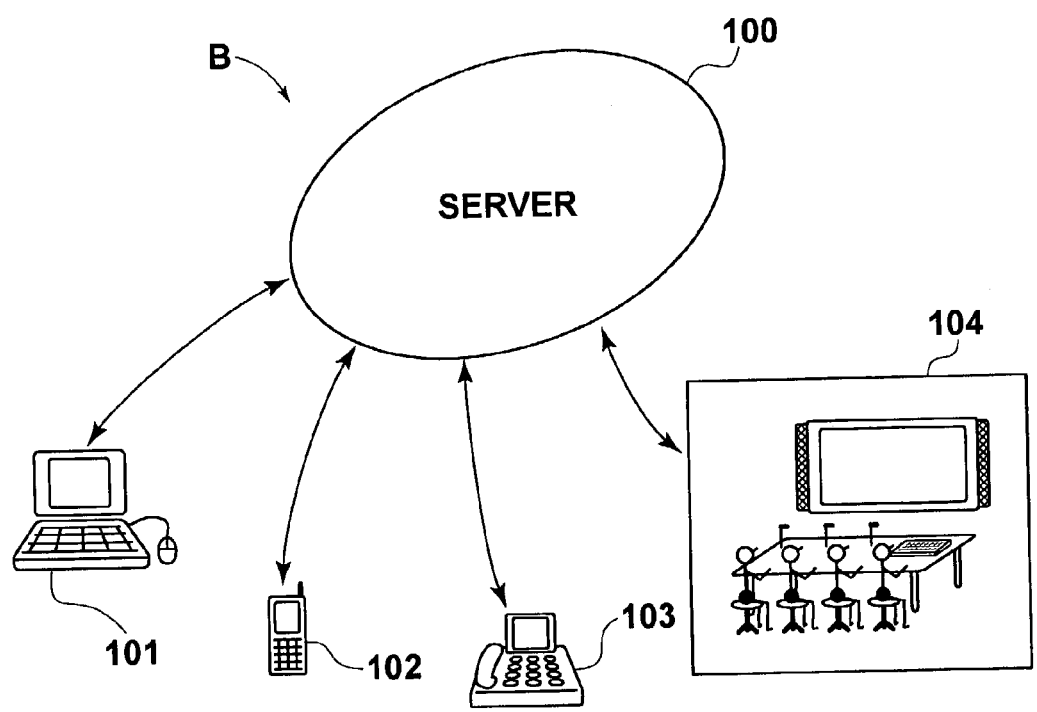
FIG. 5 is a block diagram of a teleconferencing system according to another embodiment of the teleconferencing server and teleconferencing system of the present invention.

FIG. 5 is a block diagram of a teleconferencing system B according to another embodiment of the present invention. As shown in FIG. 5, the teleconferencing system B according to the present embodiment comprises: telephone terminals such as a personal computer 101 utilizing an internet phone, a cellular phone 102, a stationary telephone 103 equipped with a liquid crystal display, a televisual teleconferencing apparatus 104, and the like; and a server 100 that realizes a teleconference utilizing the aforementioned telephone terminals. The server 100 and each of the telephone terminals are connected by a public communications network such as a telephone network, the internet or the like.

The server 100 supports only voice format, that is, receives the input data, which is formed of voice data, from each telephone terminal, subjects the input data to a multiplex process to obtain a distribution data that is the same as the voice data, and transmits said distribution data to the telephone terminals other than that which has sent the input data to realize teleconferencing.

The portable phone 102 and the stationary phone 103 are telephone terminals that only support voice format; that is, the transmitting party sends voice data to the server 100, the portable phone 102 and the stationary phone 103 receive the distribution data, which is formed of said voice data, and reproduce the voice.

The personal computer 101 converts input data that has been inputted in text format to voice data, sends the voice data to the server 100, and reproduces the distribution data, which is formed of voice data, that has been received from the server 100, as voice. The conversion of text data to voice data by the personal computer 101 is realized by conversion software installed in the personal computer 101 and hardware capable of executing said software.

Figure 6:
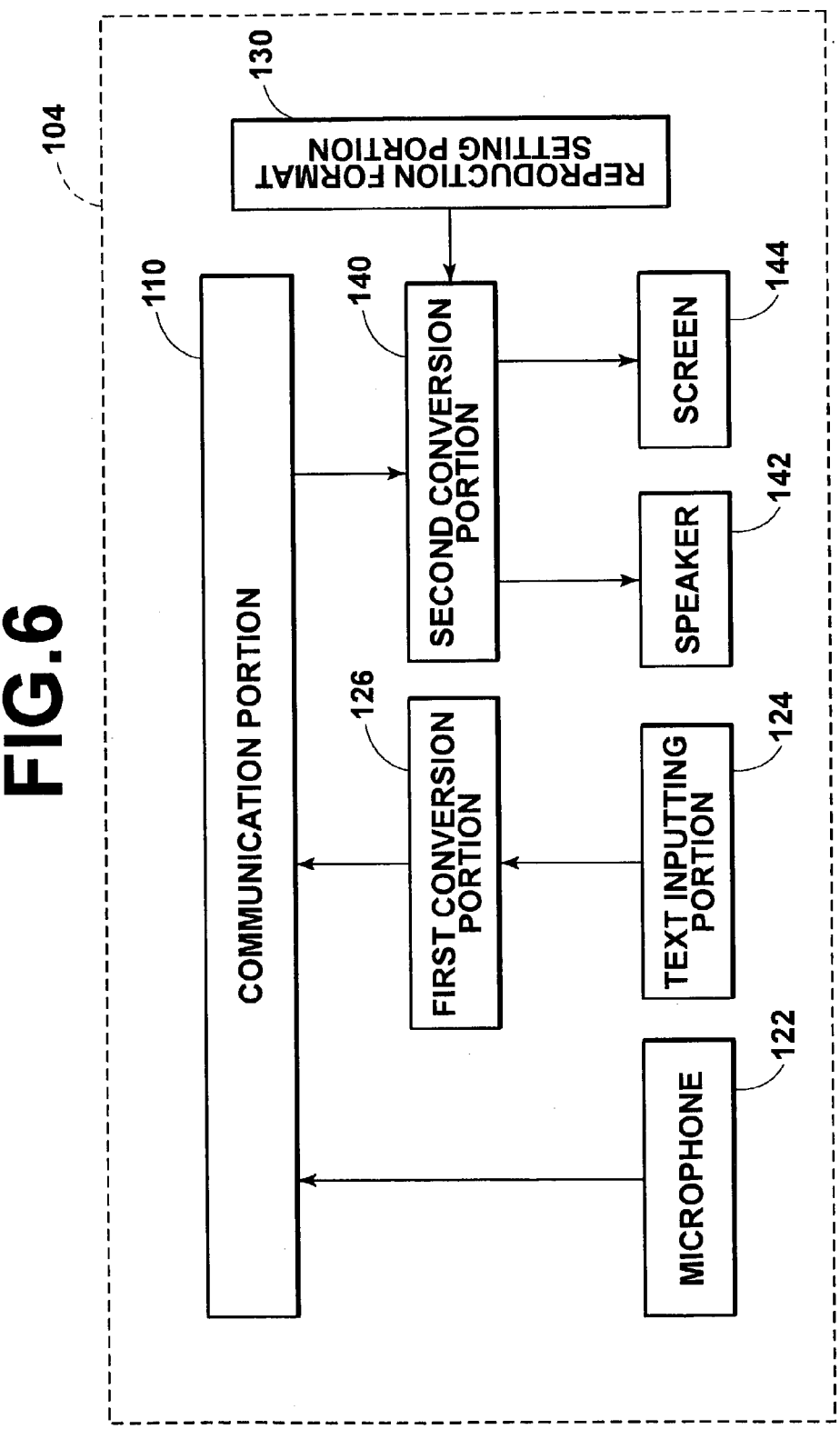
FIG. 6 is a block diagram of a televisual teleconferencing apparatus employed in the teleconferencing system of FIG. 5.

The televisual teleconferencing apparatus 104 shown in the block drawing of FIG. 6 is an apparatus for joint use by a plurality of participants. As shown in FIG. 6, the televisual teleconferencing apparatus 104 comprises: a mike 122 for transmitting parties transmitting in voice format; a text inputting portion 124 formed of a keyboard for transmitting parties transmitting in text format; a first conversion portion 126 for converting text data inputted by the text inputting portion 124 to voice data; a communication portion 110 for performing communication functions such as transmitting the voice data from the microphone 122 and the first conversion portion 126 to the server 100, receiving distribution data formed of voice data from the server 100, and the like; a speaker 142 for reproducing voice data; a screen 144 for reproducing text data; a reproduction format setting portion 130 for setting the reproduction format of the distribution data received from the server 100; and a second conversion portion 140 for converting distribution data to text format, for cases in which "text" has been set as the reproduction format by the reproduction setting portion 130, and outputting the text data to the screen 144, as well as outputting the distribution data as is to the speaker 142 without the subjection thereof to a conversion process, for cases in which "voice" has been set as the reproduction format on the one hand, and on the other hand, for outputting distribution data formed of voice data as is to the speaker 142 without the subjection thereof to a conversion process and converting distribution data formed of voice data to text data outputting the text data to the screen 144.

In this manner, according to the teleconferencing system B of the current embodiment, the televisual teleconferencing apparatus 104, which is one type of telephone terminal, can support a plurality of reproduction formats, wherein the distribution data received from the server 100 is converted to the reproduction format set by the reproduction format setting portion 130, outputted to the corresponding reproduction means (the speaker 142 or the screen 144), and reproduced in the respective format. Therefore, the distribution data sent from the server 100 can be reproduced in the format desired by the participant regardless of the reproduction format of said distribution data; whereby, even if the server side is not provided with a function for converting the input data to the format matching that used by the distribution destination, participants requiring a reproduction format that is different from the format of the distribution data can also participate in teleconferences. Further, by supporting a plurality of formats, a plurality of participants desiring respectively different reproduction formats can participate in teleconferences.

According to the teleconferencing system B shown in FIG. 5, by converting the respective input data of a plurality of types of telephone terminals, from portable phones 102 and stationary phones 103, to internet phones 101 and the televisual teleconferencing apparatuses 104, to voice data and transmitting the voice data to the server 100, a conventional teleconferencing server that only supports voice data can suffice, and the load on the server is reduced. For example, if on the one hand, each telephone terminal is provided with a function for converting input data to data conforming to a desired reproduction format and reproducing the thus converted data and the server side is not provided with a function for converting the input data to the format matching that of each respective distribution destination, and transmission and reception of each format is possible, conversion of the format of the input data is not performed on the telephone terminal side, the input data inputted in the respective input format of each telephone terminal is sent to the server, and the server can distribute to each telephone terminal distribution data in the format of the input data as is. Further, if the server side is provided with a function for converting the format of the input data, and it is made possible to specify whether or not the format of the distribution data is to be converted, the format to which the distribution data is to be converted in the case of conversion, and the like, the conversion to a specified format and subsequent distribution of the distribution data can be performed only for telephone terminals that have specified that the operations be performed.

What is claimed is:

1. A teleconferencing server which realizes teleconferencing utilizing a plurality of telephone terminals, comprising:
an input format and a reception format registering means for registering the input format and the reception format of each of the telephone terminals, the input format representing a method of communication used by a user to input information into a telephone terminal and the reception format representing a method of communication used by a user to receive information from a telephone terminal;
a receiving means for receiving input data from the telephone terminals in the input format of the respective telephone terminal;
a conversion means for converting the received input data to data conforming to the reception format of each of the plurality of telephone terminals; and
a transmitting means for transmitting the converted input data converted by the conversion means to the respective telephone terminals,
wherein the input formats and the reception formats include at least three of voice, text, Braille, and image.

2. A teleconferencing server as defined in claim 1, further comprising:
a language type recording means for recording the language utilized by the user of each of the telephone terminals, and
a language type conversion means for converting the input data to the language type utilized by each user,
wherein the transmitting means is a means for transmitting the converted input data converted by the language type conversion means to the respective telephone terminals.

3. The teleconferencing server of claim 1, wherein the image format comprises a configuration to facilitate communications by hearing-impaired users.

4. The teleconferencing server of claim 3, wherein the configuration to facilitate communications by hearing-impaired users comprises at least one of sign language and lip-reading.

5. The teleconferencing server of claim 1, wherein the input format and the reception format are set by the user of each telephone terminal and the user settings for the input format and the reception format of each telephone terminal are stored in the teleconferencing server.

6. A teleconferencing server which realizes teleconferencing utilizing a plurality of telephone terminals, comprising:
an input format and reception format registering means for registering the input format and the reception format of each of the telephone terminals;
a receiving means for receiving the input data inputted from the telephone terminals in the input format of the respective telephone terminal;
a conversion means for converting the received input data to data conforming to the reception format of each of the plurality of telephone terminals;
a transmitting means for transmitting the converted input data converted by the conversion means to the telephone terminal having the target reception format;
a language type recording means for recording the language utilized by the user of each of the telephone terminals; and
a language type conversion means for converting the input data to the language type utilized by each user,
wherein the input formats and reception formats include at least three of voice, text, Braille, and image, and
wherein the transmitting means is a means for transmitting the converted input data converted by the language type conversion means to the target telephone terminal.

7. The teleconferencing server of claim 6, wherein the image format comprises a configuration to facilitate communications by hearing-impaired users.

8. The teleconferencing server of claim 7, wherein the configuration to facilitate communications by hearing-impaired users comprises at least one of sign language and lip-reading.

9. A teleconferencing system comprising a plurality of telephone terminals and a teleconferencing server, each telephone terminal operable to transmit, as distribution data, input data to the other telephone terminals, further comprising:
- a communication means for transmitting the input data from a telephone terminal to the teleconferencing server, and for receiving the distribution data from the teleconferencing server;
- an input means for inputting the input data transmitted from the communication means to the teleconferencing server;
- a reproduction format setting means for setting a reproduction format of the distribution data from the teleconferencing server;
- a distribution data format converting means for converting the reproduction format of said distribution data to a format set by the reproduction format setting means; and
- a reproduction means for reproducing the converted distribution data,
- wherein the reproduction format represents a method of communication used by a user to receive information from a telephone terminal, the method of communication comprising voice, text and image.

10. A teleconferencing system as defined in claim 9, wherein the reproduction format setting means is configured to set a plurality of reproduction formats,
- wherein the distribution data format converting means is operable to set each distribution data to the respective reproduction format set by the reproduction format setting means, and
- wherein the reproduction means is configured to reproduce distribution data corresponding to each of the formats converted to by the reproduction format converting means.

11. The teleconferencing system of claim 10, wherein the reproduction of the distribution data in the respective formats is simultaneous.

12. The teleconferencing system of claim 10, wherein the reproduction of the distribution data in the respective formats is in a time division manner.

13. The teleconferencing system of claim 9, wherein the image format comprises a configuration to facilitate communications by hearing-impaired users.

14. The teleconferencing system of claim 13, wherein the configuration to facilitate communications by hearing-impaired users comprises at least one of sign language and lip-reading.

15. The teleconferencing system of claim 9, wherein the reproduction format comprises a format to facilitate communications by visually-impaired users.

16. The teleconferencing system of claim 15, wherein the format to facilitate communications by visually-impaired users comprises Braille.

17. A teleconferencing server used in teleconferencing at least two terminals, comprising:
- a registering portion operable to register for each terminal an input format and a reception format, the input format representing a method used by a user to input data to the terminal and the reception format representing a method used by a user to receive data;
- a receiving portion operable to receive from each terminal the input data in the respective registered input formats;
- a conversion portion operable to convert the received data from each terminal to data conforming to the reception format of the other terminal or terminals; and
- a transmitting portion operable to transmit the respective converted data to each terminal,
- wherein the input format comprises voice, text and image, and the reception format comprises voice, text and image.

18. The teleconferencing server of claim 17, wherein the image format comprises a configuration to facilitate communications by hearing-impaired users.

19. The teleconferencing server of claim 18, wherein the configuration to facilitate communications by hearing-impaired users comprises at least one of sign language and lip-reading.

20. The teleconferencing server of claim 17, wherein the input format comprises a format to facilitate communications by visually-impaired users, and
- wherein the reception format comprises a format to facilitate communications by visually-impaired users.

21. The teleconferencing server of claim 20, wherein the format to facilitate communications by visually-impaired users comprises Braille.

22. The teleconferencing system of claim 9, further comprising:
- a storage means,
- wherein the reception format is set by the user of each telephone terminal and the user setting for the reception format of each telephone terminal is stored in the storage means.

23. The teleconferencing server of claim 17, wherein the input format and the reception format are set by the user of each terminal and the user settings for the input format and the reception format of each terminal are stored in the teleconferencing server.

* * * * *